United States Patent
Nishimura

(10) Patent No.: US 11,333,154 B2
(45) Date of Patent: May 17, 2022

(54) VACUUM PUMP WITH A ROTARY BODY IN A CASE WITH THE ROTARY BODY HAVING AT LEAST THREE BALANCE CORRECTION PORTIONS ACCESSIBLE FROM AN OUTSIDE OF THE CASE FOR BALANCE CORRECTION BY AN N-PLANE METHOD

(71) Applicant: SHIMADZU CORPORATION, Kyoto (JP)

(72) Inventor: Taiki Nishimura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 510 days.

(21) Appl. No.: 16/543,864

(22) Filed: Aug. 19, 2019

(65) Prior Publication Data

US 2020/0116155 A1 Apr. 16, 2020

(30) Foreign Application Priority Data

Oct. 15, 2018 (JP) .............................. JP2018-194406

(51) Int. Cl.
- F04D 19/04 (2006.01)
- F04D 29/66 (2006.01)
- F04D 29/058 (2006.01)

(52) U.S. Cl.
CPC ......... F04D 19/042 (2013.01); F04D 29/662 (2013.01); F04C 2220/10 (2013.01);
(Continued)

(58) Field of Classification Search
CPC .. F04C 2220/10; F04D 19/042; F04D 29/058; F04D 29/662; F05D 2260/95; F16C 2360/45
(Continued)

(56) References Cited

U.S. PATENT DOCUMENTS 10,781,820 B2 * 9/2020 Watanabe ........... F16L 19/0212
2002/0159899 A1* 10/2002 Yamashita ............. F04D 29/662
417/423.4

(Continued)

FOREIGN PATENT DOCUMENTS

| CN | 103398013 A | 11/2013 | |
| DE | 102013113400 A1 * | 6/2015 | ........... F04D 19/042 |

(Continued)

OTHER PUBLICATIONS

Office Action for corresponding CN Application No. 201910949157.1, dated Sep. 3, 2020, with English language translation.
(Continued)

*Primary Examiner* — Kenneth J Hansen
*Assistant Examiner* — Benjamin Doyle
(74) *Attorney, Agent, or Firm* — Renner, Otto, Boisselle & Sklar, LLP

(57) ABSTRACT

A vacuum pump comprises: a rotary body including a rotor blade and a rotor shaft; a case rotatably housing the rotary body; a motor configured to drive the rotor shaft of the rotary body; a bearing arranged at an end portion of the rotor shaft; and at least three balance correction portions including a first balance correction portion provided on one end side of the rotary body in an axial direction, a second balance correction portion provided on the other end side of the rotary body in the axial direction, and a third balance correction portion provided between the first balance correction portion and the second balance correction portion. Balance correction by an n-plane method, where n≥3, is available such that any of the three balance correction portions is accessible from an outside of the case.

15 Claims, 3 Drawing Sheets

(52) U.S. Cl.
CPC ........ *F04D 29/058* (2013.01); *F05D 2260/95* (2013.01); *F16C 2360/45* (2013.01)

(58) Field of Classification Search
USPC .......................................... 415/90; 417/423.4
See application file for complete search history.

(56) References Cited

U.S. PATENT DOCUMENTS

| | | | | |
|---|---|---|---|---|
| 2002/0172589 | A1* | 11/2002 | Yamashita | F04D 19/04 415/90 |
| 2003/0021672 | A1* | 1/2003 | Maejima | F04D 29/662 415/90 |
| 2003/0021673 | A1* | 1/2003 | Maejima | F04D 19/04 415/90 |
| 2003/0095860 | A1* | 5/2003 | Takamine | F04D 29/662 415/90 |
| 2003/0103847 | A1* | 6/2003 | Nonaka | F04D 19/044 417/203 |
| 2003/0175113 | A1* | 9/2003 | Miwata | F04D 19/042 415/90 |
| 2007/0031270 | A1* | 2/2007 | Maejima | F04D 19/04 417/423.4 |
| 2015/0063993 | A1* | 3/2015 | Tsutsui | F04D 29/023 415/200 |
| 2020/0011336 | A1* | 1/2020 | Mitsuhashi | F04D 19/04 |
| 2021/0102536 | A1* | 4/2021 | Willig | F04C 18/0215 |

FOREIGN PATENT DOCUMENTS

| | | | | |
|---|---|---|---|---|
| EP | 2520807 | B1 * | 5/2017 | ........... F04D 19/042 |
| JP | 2008038844 | A | 2/2008 | |

OTHER PUBLICATIONS

Office Action for corresponding CN Application No. 201910949157.1, dated Mar. 30, 2021, with English language translation.
Office Action for corresponding CN Application No. 201910949157.1, dated Oct. 10, 2021, with English language translation.

* cited by examiner

VACUUM PUMP WITH A ROTARY BODY IN A CASE WITH THE ROTARY BODY HAVING AT LEAST THREE BALANCE CORRECTION PORTIONS ACCESSIBLE FROM AN OUTSIDE OF THE CASE FOR BALANCE CORRECTION BY AN N-PLANE METHOD

BACKGROUND OF THE INVENTION

1. Technical Field

The present invention relates to a vacuum pump.

2. Background Art

In a vacuum pump such as a turbo-molecular pump, unbalance correction for a rotary body including, e.g., a rotor and a rotor shaft needs to be performed. Balance correction for the rotary body is generally performed in a state in which the rotary body is attached to a balance correction tool before incorporation into a base or an outer cylinder forming a case. However, even when balance correction for the rotary body is performed with the rotary body being attached to the balance correction tool, there is a probability that the rotary body becomes eccentric with respect to a bearing due to the process of disassembling/assembling the rotary body upon incorporation into the case and unbalance occurs.

For this reason, a turbo-molecular pump configured so that balance correction for a rotary body can be performed with the rotary body being incorporated into a case has been known. One example of such a turbo-molecular pump is one (see, e.g., Patent Literature 1 (JP-A-2008-38844)) configured such that multiple screw holes are provided at the outer periphery of a disk attached to a lower end portion of a rotor shaft, a peephole is provided at a bearing arranged at a lower portion of the disk, and balance correction screws are, through the peephole, screwed into the screw holes provided at the outer periphery of the disk of the bearing to perform balance correction.

In the turbo-molecular pump described in Patent Literature 1, a balance correction portion is provided on a lower side of a rotary body. That is, the screws are screwed into some, which are necessary for balance correction, of the multiple screw holes at an outer peripheral surface of the disk provided at a lower end of the rotor shaft to correct a balance.

SUMMARY OF THE INVENTION

For using an n-plane method known as a balance correction method which can handle a speed up to an n-th critical speed (e.g., n≥3) of the rotary body, balance correction is preferably performed in the vicinity of a component as a cause for unbalance to reduce bending vibration generated by the component as the cause for unbalance. However, Patent Literature 1 fails to disclose balance correction for n (n≥3) planes.

A vacuum pump comprises: a rotary body including a rotor blade and a rotor shaft; a case rotatably housing the rotary body; a motor configured to drive the rotor shaft of the rotary body; a bearing arranged at an end portion of the rotor shaft; and at least three balance correction portions including a first balance correction portion provided on one end side of the rotary body in an axial direction, a second balance correction portion provided on the other end side of the rotary body in the axial direction, and a third balance correction portion provided between the first balance correction portion and the second balance correction portion. Balance correction by an n-plane method, where n≥3, is available such that any of the three balance correction portions is accessible from an outside of the case.

A suction port is, at the case, formed at a position facing an upper surface of an uppermost rotor blade, and the first balance correction portion is provided at a position of the rotary body accessible through the suction port.

The first balance correction portion has multiple screw holes provided between an uppermost rotor blade and the rotor shaft.

The second balance correction portion is provided below the motor at the rotor shaft, and a second access port through which the second balance correction portion is accessible from an outside of the case is provided at the case.

The second access port is a gas purge port.

The second access port is an exhaust port.

The vacuum pump further comprises: a rotor cylindrical portion provided on the other end side of the rotary body. The second access port is provided inclined with respect to a center core of the rotor shaft, the second access port provided at a portion of the case below the rotor cylindrical portion and facing to the second balance correction portion.

The second balance correction portion has a collar provided on a lower surface of a motor rotor.

The second balance correction portion has multiple screw holes provided at the collar.

The third balance correction portion is provided in a vicinity of the center of gravity of the rotary body.

A third access port through which the third balance correction portion is accessible from an outside of the case is provided at the case.

The third access port is a vent port.

The third balance correction portion has multiple screw holes provided in a region of the rotor between bases of the lowermost rotor blade and the second rotor blade from the lowermost side.

The case includes multiple suction ports, and multiple third balance correction portions accessible through the suction ports are provided between the first balance correction portion and the second balance correction portion.

The rotary body includes, in this order from an upstream side, a first turbo pump portion having the rotor blade, a second turbo pump portion having the rotor blade, and a Holweck pump portion, at a side surface of the case, a first suction port is formed in a region corresponding to an internal space on an upstream side of the first turbo pump portion, a second suction port is formed in a region corresponding to an internal space between the first turbo pump portion and the second turbo pump portion, and a third suction port is formed in a region corresponding to an internal space between the second turbo pump portion and the Holweck pump portion, the first balance correction portion is provided at a position of a side surface of the rotor shaft accessible through the first suction port, one third balance correction port is provided at a position of the side surface of the rotor shaft accessible through the second suction port, and the other third balance correction port is provided at a position of the side surface of the rotor shaft accessible through the third suction port.

According to the present invention, a balance correction portion of a rotary body is accessible from the outside of a case, and a speed up to an n-th (n≥3) critical speed of the rotary body can be handled in balance correction.

DETAILED DESCRIPTION OF THE EXEMPLARY EMBODIMENTS

Hereinafter, embodiments of the present invention will be described with reference to the drawings.

First Embodiment

Figure 1:
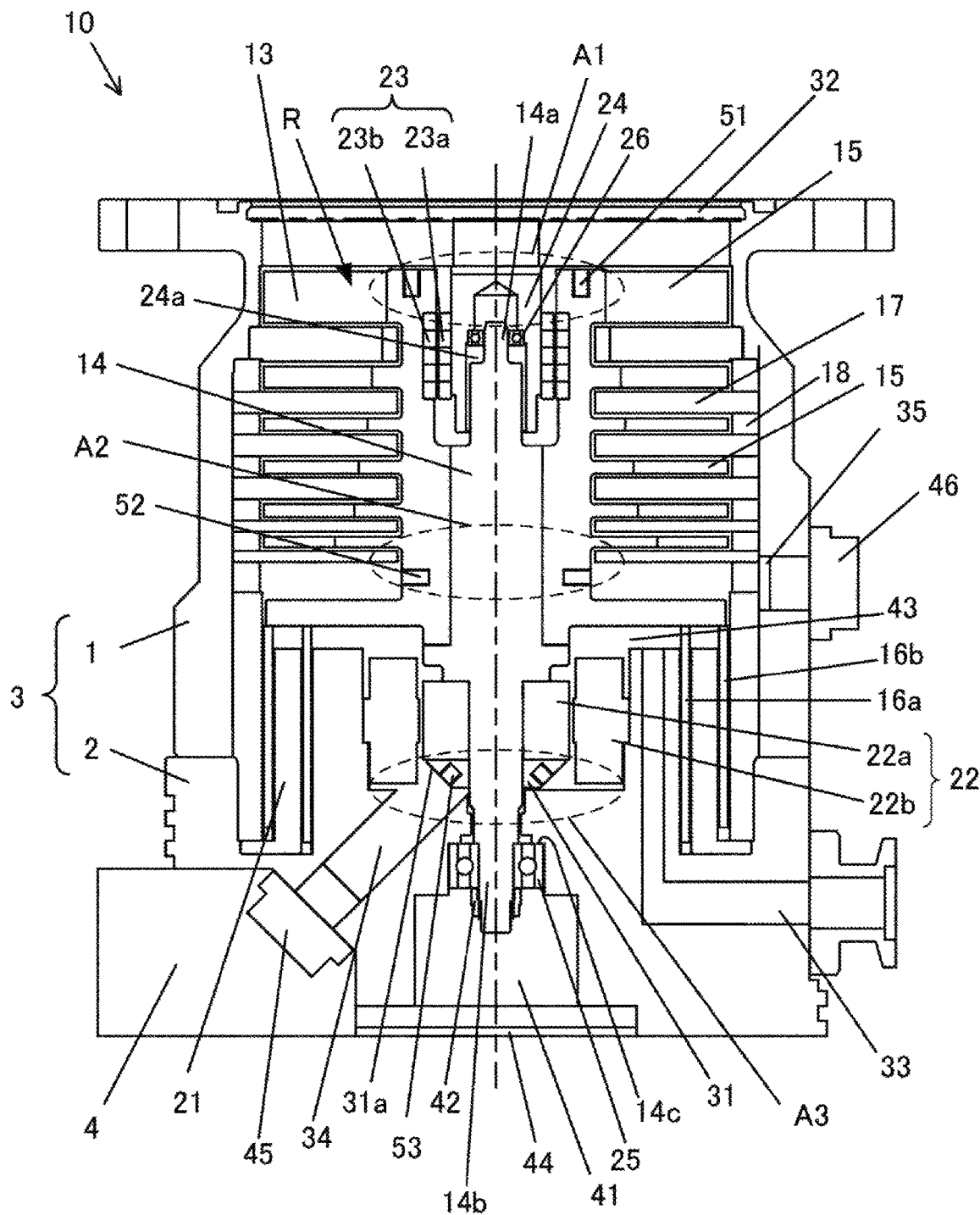
FIG. 1 is a view of a first embodiment of a vacuum pump according to the present invention.

FIG. 1 is a view of a first embodiment of a vacuum pump according to the present invention, and is a sectional view of a turbo-molecular pump 10. The turbo-molecular pump 10 is described as an example of a mechanical bearing type using a ball bearing.

The turbo-molecular pump 10 includes a case 3 having an outer cylinder 1 and a base 2, and a power source device 4. The power source device 4 is fixed to the base 2, and although not shown in the figure, includes a power supply circuit board and a control circuit board electrically connected to, e.g., a motor and a sensor housed in the case 3.

As described below, the turbo-molecular pump 10 includes, as exhaust functional sections, a turbo pump portion including turbine blades and a Holweck pump portion including a spiral groove in the case 3.

In the case 3 of the turbo-molecular pump 10, a rotor 13 and a rotor shaft 14 provided integrally with the rotor 13 are rotatably housed. The rotor 13 and the rotor shaft 14 are, for example, made of aluminum alloy, and are integrated by interference fit such as shrink fit or cooling fit. The rotor 13 has multiple rotor blades 15 arranged in multiple stages in an axial direction of the rotor shaft 14, and a pair of rotor cylindrical portions 16a, 16b provided below the rotor blades 15. A stator blade 17 is arranged between adjacent ones of the rotor blades 15. A spacer 18 arranged along an inner surface of the outer cylinder 1 is arranged between adjacent ones of the stator blades 17. The multiple stages of the rotor blades 15 formed at the rotor 13 and the multiple stages of the stator blades 17 arranged such that the rotor blades 15 and the stator blades 17 are alternately arranged form the turbo pump portion TP.

A stator 21 is arranged between the pair of rotor cylindrical portions 16a, 16b. The stator 21 is fixed to the base 2. A screw groove (not shown) is provided at one of the stator 21 or the rotor cylindrical portion 16a. Moreover, a screw groove (not shown) is provided at one of the stator 21 or the rotor cylindrical portion 16b. The pair of rotor cylindrical portions 16a, 16b and the stator 21 form the Holweck pump portion. The Holweck pump portion is provided on a downstream side of the turbo pump portion.

A motor 22 configured to rotatably drive the rotor shaft 14 is provided at an intermediate portion of the rotor shaft 14 in the axial direction thereof (hereinafter sometimes merely referred to as an "axial direction"). The motor 22 includes a motor rotor 22a provided at the rotor shaft 14, and a motor stator 22b fixed to the base 2. The rotor shaft 14 is rotatably supported by a permanent magnet magnetic bearing 23 provided on an upper side of the rotor shaft 14 in the axial direction and a mechanical bearing 25 provided on a lower side of the rotor shaft 14 in the axial direction.

The permanent magnet magnetic bearing 23 includes multiple permanent magnets 23a provided at a magnet holder 24 attached to the outer cylinder 1, and multiple permanent magnets 23b provided at the rotor 13. The multiple permanent magnets 23a and the multiple permanent magnets 23b are arranged parallel to the axial direction at equal intervals. The multiple permanent magnets 23a and the multiple permanent magnets 23b are arranged such that S-poles and N-poles thereof are alternately arranged and face each other. Thus, by repulsive force of the multiple permanent magnets 23a and the multiple permanent magnets 23b, the rotor 13 and the rotor shaft 14 integrated with the rotor 13 are rotatably supported.

Each permanent magnet 23a provided at the magnet holder 24 and each permanent magnet 23b provided at the rotor 13 are shifted from each other in the axial direction by a predetermined amount. In an example of FIG. 1, each permanent magnet 23b is positioned higher than each permanent magnet 23a in the axial direction by the predetermined amount. Thus, due to the repulsive force of the multiple permanent magnets 23a and the multiple permanent magnets 23b, support force in a radial direction and support force in an upward thrust direction of the axial direction act on the rotor 13 and the rotor shaft 14.

A hollow portion 24a housing the upper side of the rotor shaft 14 is formed at the magnet holder 24. A bearing 26 is provided in the hollow portion 24a. An upper small-diameter portion 14a provided on an upper end side of the rotor shaft 14 is inserted into an internal space of an inner ring of the bearing 26. The bearing 26 functions as a touchdown bearing configured to limit radial runout of the upper side of the rotor shaft 14. In a state in which the rotor 13 and the rotor shaft 14 are in steady rotation, the upper small-diameter portion 14a of the rotor shaft 14 and the bearing 26 do not contact each other. However, in a case where great disturbance is applied or a case where whirling of the rotor 13 and the rotor shaft 14 becomes greater upon acceleration or deceleration of rotation, the upper small-diameter portion 14a of the rotor shaft 14 comes into contact with an inner surface of the inner ring of the bearing 26. For example, a deep groove ball bearing is used as the bearing 26.

A bearing arrangement space 41 is formed at a center portion of the base 2, and the mechanical bearing 25 is arranged in the bearing arrangement space 41. The mechanical bearing 25 is a ball bearing having an inner ring, an outer ring, and a rolling element, such as an angular contact ball bearing. The entire surface of the rolling element is coated with grease for reducing friction with each of inner surfaces of the inner and outer rings. A lower small-diameter portion 14b provided on a lower end side of the rotor shaft 14 is inserted into an internal space of an inner ring of the mechanical bearing 25. The mechanical bearing 25 is pressed against and fixed to a step portion 14c of the rotor shaft 14 with a nut 42 fastened to the lower small-diameter portion 14b.

The bearing arrangement space 41 of the base 2 is sealed from the outside by a bottom plate 44 fixed to the base 2.

A collar 31 used as a thin frusto-conical balance adjustment member having a tubular hollow portion is provided below the motor rotor 22a at the rotor shaft 14. An outer peripheral surface of the collar 31 forms an inclined surface 31a configured such that the diameter thereof decreases from the upper side to the lower side in the axial direction. As described later, in the present embodiment, multiple screw holes are provided at the inclined surface 31a, and screws are screwed into the screw holes necessary for balance correction to correct a balance.

A suction port 32 is provided at an upper portion of the outer cylinder 1, and an exhaust port 33 communicating with the pump portion is provided at the base 2. Moreover, a gas purge port 34 for supplying purge gas is provided at the base 2. The function of the gas purge port 34 will be described below. In the case of emitting, e.g., chlorine-based or fluorine sulfide-based corrosive gas, there is a probability that the corrosive gas enters the motor 22 and a portion between the rotor shaft 14 and an inner surface of the base 2 from the pump portion through an internal space 43 in the case 3 and corrodes the motor 22, the mechanical bearing 25 and the like. Moreover, there is a probability that the corrosive gas generates a reactive product in the pump portion and the reactive product is accumulated in the pump portion. For these reasons, purge gas such as nitrogen gas is supplied from the gas purge port 34 to protect the motor 22, the mechanical bearing 25 and the like. Thus, the gas purge port is preferably placed in the vicinity of the motor 22 or the mechanical bearing 25. Moreover, accumulation of the reactive product in the pump portion is reduced. That is, the gas purge port 34 has, as a supply port, the function of supplying purge gas to protect members in the turbo-molecular pump 10 from corrosion by the corrosive gas and to reduce accumulation of the reactive product in the pump portion.

The inclined surface 31*a* provided at an outer peripheral portion of the collar 31 is arranged perpendicularly to an axial direction of the gas purge port 34. That is, the gas purge port 34 is provided in such a linear shape that the gas purge port 34 is inclined with respect to the center of the rotor shaft 14 from an outer peripheral portion of a region of the base 2 where the mechanical bearing 25 is arranged to the inclined surface 31*a* of the collar 31. Purge gas is supplied to the gas purge port 34 through an electromagnetic valve 45 provided at the power source device 4. When the electromagnetic valve 45 opens, purge gas is injected. When the electromagnetic valve 45 is closed, a supply of purge gas is stopped.

A vent port 35 is provided at an intermediate portion of the outer cylinder 1 in the axial direction. The vent port 35 is provided at a position corresponding to the rotor blade 15 on the lower side. In the illustrated example, the vent port 35 is provided at a position over the lowermost rotor blade 15 and the second rotor blade 15 from the lowermost side. The vent port 35 has, as an exhaust port, the function of emitting gas when the rotor 13 is stopped. The vent port 35 is closed by the electromagnetic valve 46, and upon gas emission, the electromagnetic valve 46 is opened to emit gas from the pump.

The rotor 13 having the rotor blades 15 and the rotor cylindrical portions 16*a*, 16*b*, the rotor shaft 14, the multiple permanent magnets 23*b*, and the motor rotor 22*a* form a rotary body R. The rotary body R is rotated at a speed of tens of thousands of rotations per minute by the motor 22. For the rotary body R, low vibration is demanded even during acceleration to low-speed rotation. For realizing low vibration during acceleration, the rotary body R needs to be taken as an elastic body, and deformation of the rotary body due to a bending mode needs to be taken into consideration. A multi-plane (n-plane) method has been known as a balance correction method which can handle a third critical speed or a n-th critical speed higher than the third critical speed. For using this method, balance correction needs to be performed in the vicinity of a component as a cause for unbalance to reduce bending vibration generated by the component as the cause for unbalance.

The turbo-molecular pump 10 described in the present embodiment has upper, intermediate, and lower balance correction portions A1 to A3 so that a speed up to the third critical speed can be handled in balance correction.

The upper balance correction portion A1 is provided on the upper side of the rotary body R in the axial direction, the intermediate balance correction portion A2 is provided in the vicinity of the center of gravity of the rotary body R, and the lower balance correction portion A3 is provided on the lower side of the rotary body R. Any of the upper, intermediate, and lower balance correction portions A1 to A3 is accessible from the outside of the case 3, and after the rotary body R has been assembled with the case 3, balance correction of the rotary body R can be performed.

Hereinafter, the upper, intermediate, and lower balance correction portions A1 to A3 will be described.

The upper balance correction portion A1 is provided to face the suction port 32 of the rotor 13. The upper balance correction portion A1 has multiple screw holes 51 provided between the uppermost rotor blade 15 and the rotor shaft 14. The multiple screw holes 51 are arranged at an equal center angle interval of about 20 to 45° on a circumference about the center of the rotor shaft 14. The center of each screw hole 51 is parallel to the axial direction of the rotor shaft 14. Each screw hole 51 is accessible from the outside of the case 3 through the suction port 32, and balance correction screws (not shown) are screwed into the screw holes 51 so that the balance can be adjusted.

The intermediate balance correction portion A2 is provided at a position facing the vent port 35. The intermediate balance correction portion A2 has multiple screw holes 52 provided in a region of the rotor 13 between bases of the lowermost rotor blade 15 and the second rotor blade 15 from the lowermost side. The multiple screw holes 52 are arranged at an equal center angle interval of about 20 to 45° on the circumference about the center of the rotor shaft 14. The center of each screw hole 52 is perpendicular to the axial direction of the rotor shaft 14. The vent port 35 serves as an access port for each screw hole 52. That is, the electromagnetic valve 46 is detached, and the rotary body R is rotated. In this manner, any of the screw holes 52 is accessible from the outside of the case 3, and balance correction screws (not shown) are screwed into the screw holes 52 so that the balance can be adjusted.

The lower balance correction portion A3 has the collar 31 provided on a lower surface of the motor rotor 22*a*. Multiple screw holes 53 arranged at an equal center angle interval of about 20 to 45° on a circumference about the center of the collar 31 are provided at the inclined surface 31*a* of the collar 31. As described above, the inclined surface 31*a* of the collar 31 faces the gas purge port 34, and the center of each screw hole 53 provided at the collar 31 is arranged coaxially with the gas purge port 34. The gas purge port 34 serves as an access port for each screw hole 53. That is, the electromagnetic valve 45 is detached, and the rotary body R is rotated. In this manner, any of the screw holes 53 is accessible from the outside of the case 3, and balance correction screws (not shown) are screwed into the screw holes 53 so that the balance can be adjusted.

According to the first embodiment of the present invention, the following advantageous effects are provided.

(1) The turbo-molecular pump 10 includes the rotary body R, the case 3 rotatably housing the rotary body R, the intermediate balance correction portion A2 provided at the rotary body R, and the gas purge port (the access port) 34 which is provided at the electric motor 3 and through which the intermediate balance correction portion A2 is accessible from the outside of the case 3. The intermediate balance correction portion A2 is provided in the region of the rotary body R where the rotor blades 15 are provided. Thus, the rotary body R can be accessed from the outside of the case 3, and the speed up to the third critical speed can be handled in balance correction.

(2) Moreover, the vent port 35 provided at the vacuum pump serves as the access port for the intermediate balance correction portion A2, and therefore, compatibility with a typical product can be maintained without the need for newly forming an access port.

(3) The bearing arranged at a lower end portion of the rotor shaft 14 is provided as the mechanical bearing 25. In a case where the bearing supporting the rotor shaft 14 is a magnetic bearing, balance correction is performed with the rotary body R being levitated from the bearing. For this reason, even when the rotary body R is assembled with the case after balance correction has been performed using a balance tool, unbalance is less likely to occur. However, in the case of the mechanical bearing, a clearance is present between the bearing and a bearing fixing portion, and therefore, there is a high probability that even when balance adjustment is performed with the rotary body R being attached to the balance tool, balance adjustment is necessary again after incorporation into the case 3. In the present embodiment, unbalance correction can be performed for the rotary body R supported by the mechanical bearing 25 even after assembly with the case 3.

(4) The lower balance correction portion A3 is provided below the motor 22 at the rotor shaft 14, and the exhaust port (the access port) 33 through which the lower balance correction portion A3 is accessible from the outside of the case 3 is provided at the case 3. The lower balance correction portion A3 accessible from the outside of the case 3 is provided in the vicinity of the motor 22 as the cause for unbalance, and therefore, low vibration can be realized.

(5) The gas purge port 34 is provided for the lower balance correction portion A3, and therefore, the compatibility with the typical product can be maintained without the need for newly forming an access port.

(6) The access port for the lower balance correction portion A3 is provided inclined with respect to the center of the rotor shaft 14 from a portion of the case 3 below the rotor cylindrical portions 16a, 16b to the lower balance correction portion A3. With this configuration, the lower balance correction portion A3 can be provided at the base 2 to avoid the rotor cylindrical portions 16a, 16b and the mechanical bearing 25.

(7) In addition to the intermediate and lower balance correction portions A2, A3, the upper balance correction portion A1 accessible through the suction port 32 of the case 3 is provided at the upper portion of the rotor 13. Thus, balance correction for all of three planes can be performed after the rotary body R has been incorporated into the case 3.

Second Embodiment

Figure 2:
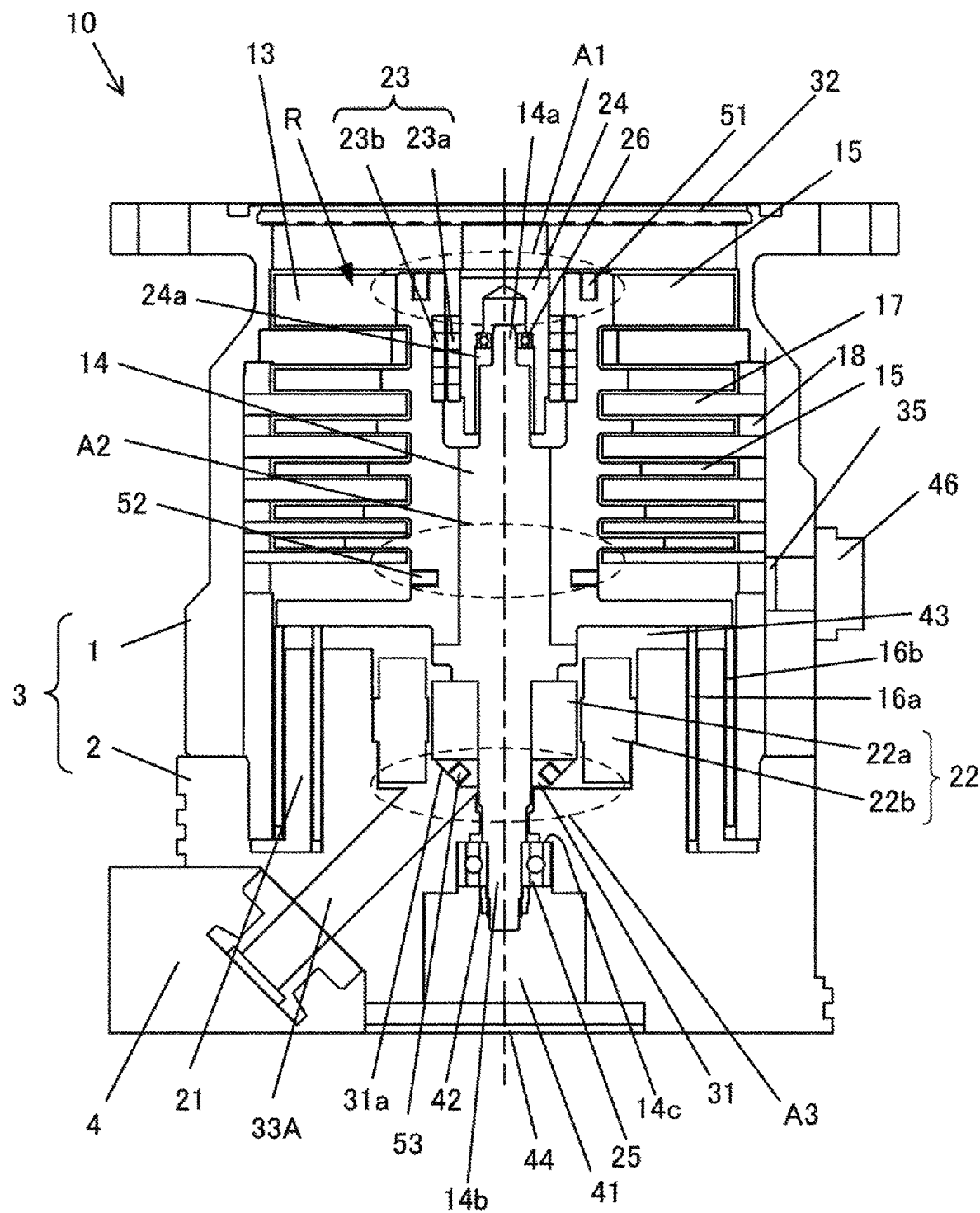
FIG. 2 is a view of a second embodiment of the vacuum pump according to the present invention.

FIG. 2 is a view of a second embodiment of the vacuum pump according to the present invention.

In the second embodiment, an access port for a lower balance correction portion A3 is an exhaust port 33A.

As illustrated in FIG. 2, the exhaust port 33A of a vacuum pump 10 is, as in the gas purge port 34 of the first embodiment, provided in such a linear shape that the exhaust port 33A is inclined with respect to the center of a rotor shaft 14 from an outer peripheral portion of a region of a base 2 where a mechanical bearing 25 is arranged to an inclined surface 31a of a collar 31. The center of each screw hole 53 provided at the collar 31 is arranged coaxially with the exhaust port 33A. That is, the exhaust port 33A serves as an access port for each screw hole 53. A pipe line connected to a back pump can be connected to the exhaust port 33A, and the exhaust port 33A does not have the electromagnetic valve 45 of the first embodiment. Thus, in the second embodiment, when balance correction is performed at the lower balance correction portion A3, the trouble of detaching/attaching the electromagnetic valve 45 is not necessary.

Other configurations in the second embodiment are similar to those of the first embodiment. The same reference numerals are used to represent corresponding members, and description thereof will be omitted. Thus, in the second embodiment, advantageous effects similar to the advantageous effects (1) to (3), (6), and (7) of the first embodiment are also provided. Note that although not shown in the figure, a gas purge port only for supplying purge gas may be provided in the second embodiment.

In each embodiment described above, the structure in which the rotor shaft 14 is supported by the mechanical bearing 25 and the permanent magnet magnetic bearing 23 has been described by way of example. However, instead of the mechanical bearing 25, a structure using a magnetic bearing may be employed. In this case, it may be configured such that radial magnetic bearings are arranged at the upper and lower portions of the rotor shaft 14, a disk having a larger diameter than that of the rotor shaft is attached to the rotor shaft 14, and a pair of thrust magnetic bearings is arranged above and below the disk. With this structure, the permanent magnet magnetic bearing 23 can be omitted.

In each embodiment described above, the structure in which the rotor shaft 14 and the rotor 13 are integrated by interference fit has been described, but it may be configured such that the rotor shaft 14 and the rotor 13 are integrated by a bolt fastening structure.

In each embodiment described above, the method in which at the upper, intermediate, and lower balance correction portions A1 to A3, balance correction is performed by screwing of the balance correction screws into the screw holes 51 to 53 has been described by way of example. However, the balance correction screws may be screwed into the screw holes 51 to 53 in advance, and unbalance may be corrected by detachment of the balance correction screws.

Moreover, the structure in which at the upper and intermediate balance correction portions A1, A2, the screw holes 51, 52 are directly provided at the rotor 13 has been described by way of example. However, it may be configured such that a balance correction member provided with the screw holes 51, 52 may be attached to the rotor 13. Alternatively, unbalance may be, without providing the screw holes at the balance correction member, corrected in such a manner that part of the balance correction member is chipped off upon balance correction.

The turbo-molecular pump 10 has been described above as one example of the vacuum pump. However, the present invention can be applied to a turbo-molecular pump including only a turbo pump portion.

In the present embodiment, the vacuum pump configured so that balance correction can be performed by a three-plane method has been described. However, for further realizing low vibration and handling an increase in a vibration mode generated by high-speed rotation, the present invention may be a vacuum pump configured so that balance correction can be performed by a four-plane method, i.e., a vacuum pump configured such that a rotary body R has four or more balance correction portions. Next, such a third embodiment will be described.

Third Embodiment

Figure 3:
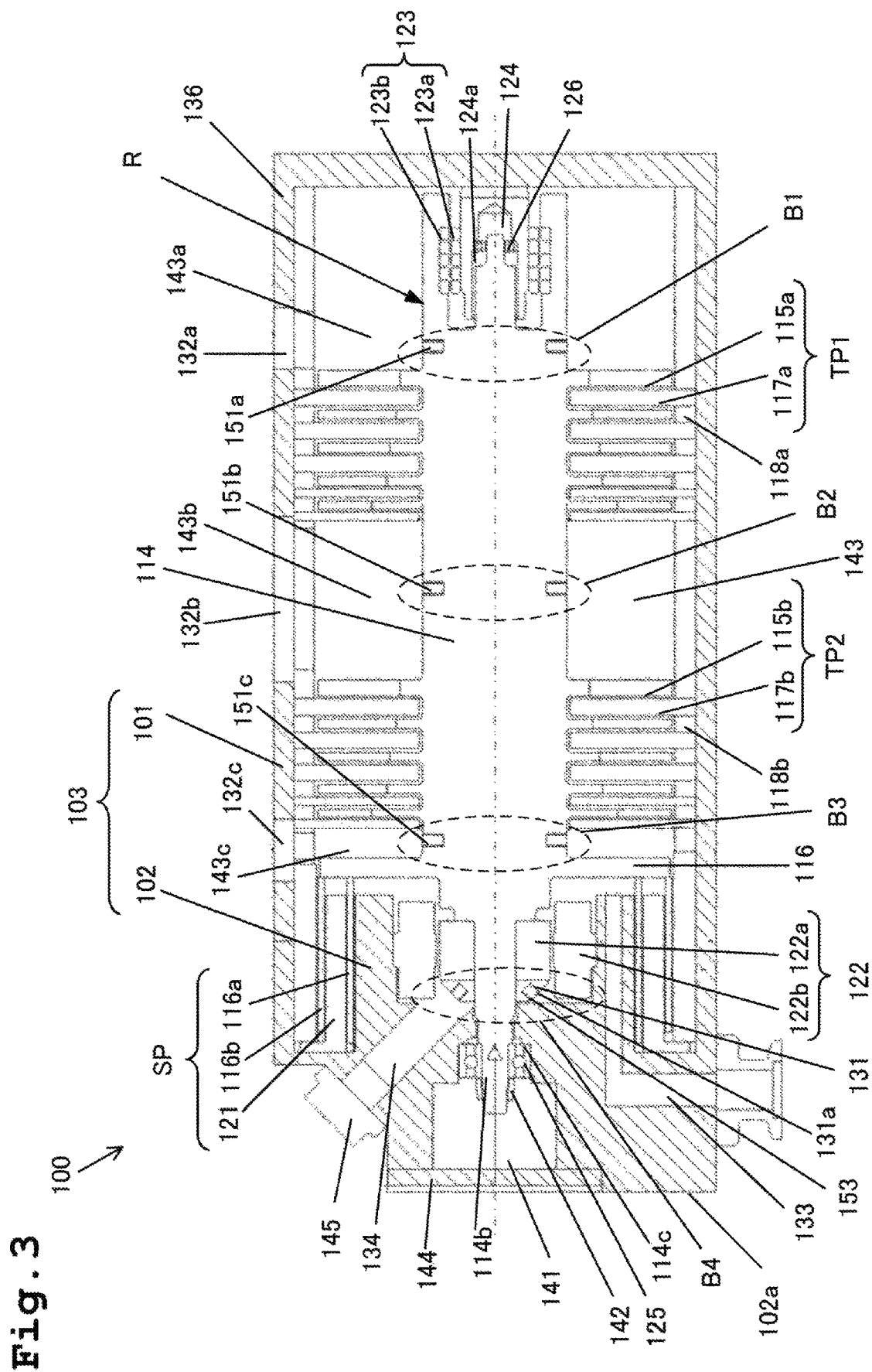
FIG. 3 is a view of a third embodiment of the vacuum pump according to the present invention.

FIG. 3 is a view of a third embodiment of the vacuum pump according to the present invention, and is a sectional view of a turbo-molecular pump (a vacuum pump) 100. The turbo-molecular pump 100 includes multiple suction ports 132a to 132c as described below, and for example, is used as a vacuum pump for a vacuum device such as a mass spectrometer.

The turbo-molecular pump 100 includes a case 103 having an outer cylinder 101 and a base 102.

As described below, the vacuum pump 100 includes two turbo pump portions TP1, TP2 and a Holweck pump portion SP in the case 103.

A rotor shaft 114 is housed in the case 3 of the vacuum pump 100. A rotor cylindrical base portion 116 is provided at the rotor shaft 114, and a pair of rotor cylindrical portions 116a, 116b extending to a bottom surface 102a side of the base 102 is provided on an outer peripheral side of the rotor cylindrical base portion 116.

Multiple rotor blades 115a provided at the rotor shaft 114 and multiple stator blades 117a each arranged between adjacent ones of the rotor blades 115a form the first turbo pump portion TP1. The multiple stator blades 117a are clamped and held by multiple spacers 118a each arranged between adjacent ones of the stator blades 117a. Moreover, multiple rotor blades 115b provided at the rotor shaft 114 and multiple stator blades 117b each arranged between adjacent ones of the rotor blades 115b form the second turbo pump portion TP2. The multiple stator blades 117b are clamped and held by multiple spacers 118b each arranged between adjacent ones of the stator blades 117b. A right side when facing the rotor shaft 114 in FIG. 3 is an upstream side of a flow path, and the second turbo pump portion TP2 is provided on the downstream side of the first turbo pump portion TP1.

A stator 121 is arranged between the pair of rotor cylindrical portions 116a, 116b provided at the rotor cylindrical base portion 116 of the rotor shaft 114. The stator 121 is fixed to the base 102. A screw groove (not shown) is provided at either one of an inner peripheral surface of the stator 121 or an outer peripheral surface of the rotor cylindrical portion 116a. Moreover, a screw groove (not shown) is provided at either one of an outer peripheral surface of the stator 121 or an inner peripheral surface of the rotor cylindrical portion 116b. The pair of rotor cylindrical portions 116a, 116b and the stator 121 form the Holweck pump portion SP. The Holweck pump portion SP is provided on the downstream side of the second turbo pump portion TP2.

A motor 122 configured to rotatably drive the rotor shaft 114 is provided on a base-102-side end portion of the rotor shaft 114 in an axial direction thereof. The motor 122 includes a motor rotor 122a provided at the rotor shaft 114, and a motor stator 122b fixed to the base 102. The rotor shaft 114 is rotatably supported by a permanent magnet magnetic bearing 123 provided at an upstream end portion of the rotor shaft 114 in the axial direction thereof and a mechanical bearing 125 provided at a downstream end portion of the rotor shaft 114 in the axial direction thereof.

The permanent magnet magnetic bearing 123 includes multiple permanent magnets 123a provided at a magnet holder 124 attached to the outer cylinder 101, and multiple permanent magnets 123b provided at the rotor shaft 114. The multiple permanent magnets 123a and the multiple permanent magnets 123b are arranged parallel to the axial direction at equal intervals.

A hollow portion 124a housing an upper side of the rotor shaft 114 is formed at the magnet holder 124, and a bearing 126 is provided in the hollow portion 124a. An upper small-diameter portion 114a provided at an end portion of the rotor shaft 114 is inserted into an internal space of an inner ring of the bearing 126.

A bearing arrangement space 141 is formed at a center portion of the base 102, and the mechanical bearing 125 is arranged in the bearing arrangement space 141. A lower small-diameter portion 114b provided on a lower end side of the rotor shaft 114 is inserted into an internal space of an inner ring of the mechanical bearing 125. The mechanical bearing 125 is pressed against and fixed to a step portion 114c of the rotor shaft 114 with a nut 142 fastened to the lower small-diameter portion 114b.

The bearing arrangement space 141 of the base 102 is sealed from the outside by a bottom plate 144 fixed to the base 102.

A collar 131 used as a thin frusto-conical balance adjustment member having a tubular hollow portion is provided at a surface of the rotor shaft 114 on a base 102 side of the motor rotor 122a. An outer peripheral surface of the collar 131 forms an inclined surface 131a configured such that the diameter thereof decreases from the upper side to a lower side in the axial direction. As in the first embodiment, in the third embodiment, multiple screw holes are provided at the inclined surface 31a, and screws are screwed into the screw holes necessary for balance correction to correct a balance.

A flange portion 136 attached to a not-shown vacuum device is provided at an upper portion of the outer cylinder 101. Three suction ports 132a, 132b, 132c communicating with an internal space 143 of the outer cylinder 101 are provided at the flange portion 136. The suction port 132a is provided in a region corresponding to an internal space 143a on the upstream side of the first turbo pump portion TP1. The suction port 132b is provided on the upstream side of the second turbo pump portion TP2, i.e., in a region corresponding to an internal space 143b between the second turbo pump portion TP2 and the first turbo pump portion TP1. The suction port 132c is provided in a region corresponding to an internal space 143c between the rotor cylindrical base portion 116 and a downstreammost one of the stator blades 117b forming the second turbo pump portion TP2.

An exhaust port 133 communicating with the Holweck pump portion SP is provided at the base 102. Moreover, a gas purge port 134 for supplying purge gas is provided at the base 102.

As in the first embodiment, the inclined surface 131a provided at an outer peripheral portion of the collar 131 is arranged perpendicularly to an axial direction of the gas purge port 134, and purge gas is supplied to the gas purge port 134 through an electromagnetic valve 145 provided at the base 102. When the electromagnetic valve 145 opens, purge gas is injected. When the electromagnetic valve 145 is closed, a supply of purge gas is stopped.

The rotor shaft 114, the rotor blades 115a, 115b, the rotor cylindrical base portion 116 having the rotor cylindrical portions 116a, 116b, the multiple permanent magnets 123b, and the motor rotor 122a form a rotary body R.

The turbo-molecular pump 100 described in the third embodiment has four first to fourth balance correction portions B1 to B4 so that a speed up to a fourth critical speed can be handled in balance correction.

The first balance correction portion B1 is provided on the upstream side of the first turbo pump portion TP1 at the rotary body R, the second balance correction portion B2 is provided between the first turbo pump portion TP1 and the second turbo pump portion TP2 at the rotary body R, the third balance correction portion B3 is provided between the second turbo pump portion TP2 and the rotor cylindrical base portion 116 at the rotary body R, and the fourth balance correction portion B4 is provided on the downstream side of the motor 122 provided at the rotary body R. Any of the first to fourth balance correction portions B1 to B4 is accessible from the outside of the case 103, and after the rotary body R has been assembled with the case 103, balance correction can be performed for the rotary body R.

Hereinafter, the first to fourth balance correction portions B1 to B4 will be described.

The first balance correction portion B1 is provided on the upstream side of the first turbo pump portion TP1 at the rotary body R. The first balance correction portion B1 has multiple screw holes 151a provided at the rotor shaft 114. The multiple screw holes 151a are arranged at an equal center angle interval of about 20 to 45° on a circumference about the center of the rotor shaft 114. The center of each screw hole 151a is arranged perpendicularly to the axial direction of the rotor shaft 114. Each screw hole 151a is accessible from the outside of the case 103 through the suction port 132a, and balance correction screws (not shown) are screwed into the screw holes 151a so that the balance can be adjusted.

The second balance correction portion B2 is provided between the first turbo pump portion TP1 and the second turbo pump portion TP2 at the rotary body R, i.e., the second turbo pump portion TP2. The second balance correction portion B2 has multiple screw holes 151b provided at the rotor shaft 114. The multiple screw holes 151b are arranged at an equal center angle interval of about 20 to 45° on the circumference about the center of the rotor shaft 114. The center of each screw hole 151b is arranged perpendicularly to the axial direction of the rotor shaft 114. Each screw hole 151b is accessible from the outside of the case 103 through the suction port 132b, and balance correction screws (not shown) are screwed into the screw holes 151b so that the balance can be adjusted.

The third balance correction portion B3 is provided between the second turbo pump portion TP2 and the rotor cylindrical base portion 116 at the rotary body R, i.e., between the second turbo pump portion TP2 and the Holweck pump portion SP. The third balance correction portion B3 has multiple screw holes 151c provided at the rotor shaft 114. The multiple screw holes 151c are arranged at an equal center angle interval of about 20 to 45° on the circumference about the center of the rotor shaft 114. The center of each screw hole 151c is arranged perpendicularly to the axial direction of the rotor shaft 114. Each screw hole 151c is accessible from the outside of the case 103 through the suction port 132c, and balance correction screws (not shown) are screwed into the screw holes 151c so that the balance can be adjusted.

The fourth balance correction portion B4 has the collar 131 provided on a lower surface of the motor rotor 122a. Multiple screw holes 153 arranged at an equal center angle interval of about 20 to 45° on a circumference about the center of the collar 131 are provided at the inclined surface 131a of the collar 131. As described above, the inclined surface 131a of the collar 131 faces the gas purge port 134, and the center of each screw hole 153 provided at the collar 131 is arranged coaxially with the gas purge port 134. The gas purge port 134 serves as an access port for each screw hole 153. That is, the electromagnetic valve 145 is detached, and the rotary body R is rotated. In this manner, any of the screw holes 153 is accessible from the outside of the case 103, and balance correction screws (not shown) are screwed into the screw holes 153 so that the balance can be adjusted.

As described above, the vacuum pump 100 of the third embodiment includes the first to fourth balance correction portions B1 to B4 accessible from the outside of the case 103, and the speedup to the fourth critical speed of the rotary body R can be handled in balance correction.

Note that in each embodiment described above, balance correction for three and four correction planes has been described by way of example. However, the present invention can be broadly applied to n-plane (n≥3) balance correction for five or more correction planes.

Moreover, in each embodiment described above, the configuration in which the access port from the outside is provided for each balance correction plane has been described by way of example. However, in a configuration in which the balance correction planes are provided at positions close to each other, it may be configured such that multiple balance correction planes are accessible through a single access port.

Various embodiments and variations have been described above, but the present invention is not limited to the contents of these embodiments and variations. The aspects of the above-described embodiments may be combined or modified as necessary. Other aspects conceivable within the scope of the technical idea of the present invention are also included in the scope of the present invention.

What is claimed is:

1. A vacuum pump comprising:
   a rotary body including a rotor blade and a rotor shaft;
   a case rotatably housing the rotary body;
   a motor configured to drive the rotor shaft of the rotary body;
   a bearing arranged at an end portion of the rotor shaft; and
   at least three balance correction portions including a first balance correction portion provided on one end side of the rotary body in an axial direction, a second balance correction portion provided on the other end side of the rotary body in the axial direction, and a third balance correction portion provided between the first balance correction portion and
   the second balance correction portion, wherein any of the three balance correction portions are accessible from an outside of the case after the rotary body has been assembled within the case.

2. The vacuum pump according to claim 1,
   wherein a suction port in the case is formed at a position facing an upper surface of an uppermost rotor blade, and
   the first balance correction portion is provided at a position of the rotary body accessible through the suction port.

3. The vacuum pump according to claim 1, wherein
   the first balance correction portion has multiple screw holes provided between an uppermost rotor blade and the rotor shaft.

4. The vacuum pump according to claim 1, wherein
   the second balance correction portion is provided below the motor at the rotor shaft, and
   a second access port through which the second balance correction portion is accessible from outside of the case is provided in the case.

5. The vacuum pump according to claim 4, wherein
   the second access port is a gas purge port.

6. The vacuum pump according to claim 4, wherein
   the second access port is an exhaust port.

7. The vacuum pump according to claim 4, further comprising:
   a rotor cylindrical portion provided on the other end side of the rotary body, wherein the second access port is provided inclined with respect to a center core of the rotor shaft, the second access port provided at a portion of the case below the rotor cylindrical portion and facing to the second balance correction portion.

8. The vacuum pump according to claim 1, wherein:
the second balance correction portion has a collar provided on a lower surface of a motor rotor.

9. The vacuum pump according to claim 8, wherein:
the second balance correction portion has multiple screw holes provided in the collar.

10. The vacuum pump according to claim 1, wherein
the third balance correction portion is provided in a vicinity of the center of gravity of the rotary body.

11. The vacuum pump according to claim 1, wherein
a third access port through which the third balance correction portion is accessible from outside of the case is provided in the case.

12. The vacuum pump according to claim 11, wherein
the third access port is a vent port.

13. The vacuum pump according to claim 1, wherein
the third balance correction portion has multiple screw holes provided in a region of the rotor between respective bases of the lowermost rotor blade and the second rotor blade at the other end side of the rotary body.

14. The vacuum pump according to claim 1, wherein
the case includes multiple suction ports, and multiple third balance correction portions accessible through the suction ports are provided between the first balance correction portion and the second balance correction portion.

15. The vacuum pump according to claim 1, wherein
the rotary body includes, in this order from an upstream side, a first turbo pump portion comprising a first portion of the rotor blade, a second turbo pump portion comprising a second portion of the rotor blade, and a Holweck pump portion at a side surface of the case,
a first suction port is formed in a region corresponding to an internal space on an upstream side of the first turbo pump portion, a second suction port is formed in a region corresponding to an internal space between the first turbo pump portion and the second turbo pump portion, and a third suction port is formed in a region corresponding to an internal space between the second turbo pump portion and the Holweck pump portion,
the first balance correction portion is provided at a position of a side surface of the rotor shaft accessible through the first suction port,
one third balance correction port is provided at a position of the side surface of the rotor shaft accessible through the second suction port, and
the other third balance correction port is provided at a position of the side surface of the rotor shaft accessible through the third suction port.

* * * * *